United States Patent [19]

Noel et al.

[11] Patent Number: 5,782,503
[45] Date of Patent: Jul. 21, 1998

[54] THREADED JOINT FOR TUBES

[75] Inventors: Thierry Noel, Sebourg, France; Akira Narita, Osaka, Japan

[73] Assignees: Vallourec Oil & Gas, Aulnoyes-Aymeries, France; Sumitomo Metal Industries, Osaka, Japan

[21] Appl. No.: 636,932

[22] Filed: Apr. 24, 1996

[30] Foreign Application Priority Data

Apr. 28, 1995 [FR] France ................................ 95 05371

[51] Int. Cl.⁶ ...................................................... F16L 7/00
[52] U.S. Cl. .................................... 285/94; 285/334
[58] Field of Search ................................ 285/333, 334, 285/355, 390, 94

[56] References Cited

FOREIGN PATENT DOCUMENTS

| | | |
|---|---|---|
| 0 027 771 | 4/1981 | European Pat. Off. . |
| 0 424 147 | 10/1991 | European Pat. Off. . |
| 0 488 912 | 6/1992 | European Pat. Off. . |
| 1 489 013 | 6/1967 | France . |
| 38 05 512 | 9/1988 | Germany . |
| 2 146 085 | 4/1985 | United Kingdom . |
| 2 156 933 | 10/1985 | United Kingdom . |

*Primary Examiner*—Dave W. Arola
*Attorney, Agent, or Firm*—Oblon, Spivak, McClelland, Maier & Neustadt, P.C.

[57] ABSTRACT

The threaded joint for tubes according to the invention concerns sealed end to end connections of metal tubes useable in particular in the petroleum industry. This joint comprises a sleeve provided with two housings with tapered threads into which are screwed the male extremities of two metal tubes provided with corresponding threads having non-threaded extremity zones the front walls of which abut one against the other, a clearance existing between the lateral walls of these zones and the annular wall of he sleeve opposite. Two pairs of male/female shoulder stops prevent over-screwing. The heights of the teeth of the male and female threads are identical.

15 Claims, 3 Drawing Sheets

Fig:2

THREADED JOINT FOR TUBES

The threaded joint for tubes according to the invention relates to tubes used for exploration and extraction of petroleum deposits, for geothermal energy use and for all applications in which metal tubes have to be joined end to end.

Although the threaded joint according to the invention can be used for all these applications, and more particularly for the production of extraction tubes (tubing) or casing in the petroleum industry, it is more especially suitable for relatively large diameter tubes, such as those used for producing casing.

Different types of threaded joints for metal tubes allow good mechanical strength and good sealing to be obtained at the same time.

For this reason assembly sleeves comprising at each extremity a housing provided with a tapered female thread are most often used, into which the extremity of a tube provided with a corresponding tapered male thread engages.

As a general rule, these threads do not in themselves provide the joint with sufficient sealing, as the pressurised petroleum or gas circulates along the threads because of clearances present. The use of greases loaded with solid particles, such as graphite, delays these leaks but does not eliminate them. Additionally, most often these joints are provided with annular sealing zones which, by virtue of tightening accompanied by a sufficient elastic deformation, allow a sealed metal/metal contact to be produced.

Sealed joints of this type are known from French patent 14 89 013. This threaded joint comprises an abutting zone formed at the extremity of the male joint element by a concave tapered surface which bears against a corresponding convex tapered female surface. A convex tapered bearing surface adjacent to the male abutment bears simultaneously upon a concave tapering female surface and ensures metal/metal sealing. European patent application 91420417.7 describes a refinement of this type of joint.

This type of sealed joint is very efficient but requires significant thickness of the female component because of the existence of a heel in which these bearing and abutting zones are produced.

In order to avoid this disadvantage, European patent 0027771 describes a threaded joint for tubes using a sleeve, in which the male extremities of these tubes comprises leading edges which abut one against the other inside the sleeve when screwing is completed. According to this patent, the leading edges have a specific profile, for example concave tapering, in order to promote an expansion of the diameter of these leading edges which bear against the internal wall of the sleeve, thus creating a metal/metal seal at this level.

In this way the thickness of the sleeve can be reduced but the abutting surfaces of the leading edges deform plastically with repeated screwing up and unscrewing; there is a progressive loss of sealing, not only at the level of these abutting surfaces but also at the contact surface between the external wall of these surfaces and the internal wall of the sleeve. Moreover the degree of screwing of the male extremities into the sleeve and the mechanical strength of such joints can vary substantially resulting in operating conditions which are hard to reproduce and hardly reliable for the zone in which the leading edges of the tubes abut one against the other.

The possibility of practically obtaining a sufficient degree of sealing has been sought by perfecting and considerably modifying the configuration of such a joint. It has also been sought to make the characteristics of the joint reliable and constant despite successive screwing up and unscrewing to which it is subjected. In particular the possibility has been sought of providing the tapered thread with a true sealing role, in addition to its role as a mechanical connection means, by combining the effect of different components of the joint. It has thus been sought to regulate in a reproducible and precise manner the geometrical position of different male components with respect to the female components of the joint. It has been sought to produce threads having an increased resistance to axial strain at the same time as a very high resistance to internal pressure, in order to avoid the risk of tearing of the threads, the profile of these threads also being conceived such as to obtain very good sealing while allowing repeated screwing up and unscrewing with a low risk of seizing.

The possibility has also been sought in particular of establishing with precision the degree of screwing to be carried out in the factory in order to ensure sufficient tightening of a first male element in a female housing of a sleeve in a reproducible manner, and to allow later screwing of the second male element, for example at the workplace, into the second housing of the same sleeve with an appropriate degree of tightening, to obtain satisfactory sealing.

Lastly, a configuration has been sought which results in an economical joint which is simple to produce at the workplace and in the factory.

The threaded joint for metal tubes which is the subject-matter of the invention allows the results sought to be achieved.

This joint comprises a sleeve provided with two female housings each provided with a tapered internal thread, disposed according to a common axis, of the same dimensions, into each of which is screwed a male element of a tube provided with an external tapered thread corresponding to the thread of the female housing and which comprises beyond the small diameter extremity of its thread a non-threaded extremity zone terminating in a front wall, the front walls of the two male elements abutting one against the other when screwing is completed.

The dimensions of the male elements and of the female housings are determined so that when screwing is completed the front walls of the extremity zones of the male elements abut according to a plane perpendicular to the axis of the sleeve, this plane being always located in a precisely determined axial position and preferably in the immediate vicinity of the centre of the sleeve.

According to the invention the section of the axial passage produced in the sleeve between the two threaded female housings is determined such that throughout the entire length of the passage there is sufficient clearance between the external walls of the two non-threaded extremity zones of the two male elements and the internal wall facing this passage in the sleeve to allow the joint to be produced.

In the assembled state, no metal/metal sealing is ensured in the joint between the external walls of the two non-threaded extremity zones of the two male elements and the internal wall facing the axial passage of the sleeve. However, in an unexpected manner, there can exist a non-continuous and non-sealing contact between certain zones of the axial passage of the sleeve and the zones facing the external walls of the non-threaded extremity zones.

These external walls and the internal wall can have different geometrical shapes which are dependent upon the possibility of ensuring the clearances described. These shapes can, for example, be conical according to the common axis.

In a particularly advantageous manner, the section of the axial passage is cylindrical, as is the external wall of the two non-threaded extremity zones of the two male elements, the common axis being the axis of the joint.

In order to produce sufficient, regulated and precise but not excessive tightening of each of the male elements in its female housing, the joint comprises stop shoulders. Thus at least one of the two female housings is provided with a stop shoulder the bearing surface of which is suitable for abutting against the bearing surface of a corresponding shoulder formed on the male element associated therewith.

When only one female housing comprises a shoulder, it is on the side of this female housing into which the male element corresponding therewith has to be screwed and tightened during production of the joint.

In order to avoid particularising the male elements by distinguishing between those provided with a shoulder and those not provided with a shoulder, the sleeve in which only one female housing is provided with a shoulder is provided with a shape such that the female housing not provided with a shoulder can accept, in the screwed and tightened state, any male element corresponding therewith, whether it is provided with a stop shoulder or not.

In a preferred manner each of the two female housings is provided with a stop shoulder the bearing surface of which is suitable for abutting against the bearing surface of a corresponding shoulder formed on each of the two male elements.

The two bearing surfaces of the two male shoulders are equidistant from the front wall of the corresponding extremity zone and the two bearing surfaces of the two female shoulders are equidistant from the median plane of the axial passage, which generally corresponds to the median plane of the sleeve, the distance apart of the bearing surfaces of the male shoulders from one another when the front walls of the male extremity zones are abutted being slightly greater than the distance apart of the bearing surfaces of the female shoulders. This slight difference in distance apart is determined, according to the invention, such that after screwing and tightening of the two male elements with abutment of their front walls, at least one of the two pairs of male/female shoulders retains a slight clearance between its two bearing surfaces facing one another.

This slight clearance is pre-determined so that taking into account the geometry of the male and female threads described hereinafter, the tightening of the corresponding male element in its female housing achieves the desired degree for obtaining satisfactory sealing and mechanical cohesion, the front walls abutting the male elements being positioned as previously described.

The stop shoulders can be situated at different locations with respect to the thread.

The dimensions of the male elements and the female housings as well as the respective position of the stop shoulders on the sleeve and on the male element or elements are determined such that in the screwed-tightened state there is a precise and perfectly regulated interference between the corresponding threads, this resulting in contact pressures between the crests and roots of the teeth because of the geometry of the threads explained hereinafter.

According to the invention the male thread teeth are provided, over an axial length representing a part of the total length of the threaded zone, which length includes the vanishing threads, with a constant height identical to the height of the teeth of the female threads.

In a preferred manner the part of the total length of the threaded zone over which the male thread teeth have a constant height identical to the height of the teeth of the female threads, is equal to at least a quarter of the total length of the threaded zone.

Advantageously, the heights of the male and female teeth are identical along the whole of the length of the threaded zone in which the teeth have their full height.

In this way, and selecting a common nominal value and the same tolerances for the height of the male and female teeth, the surface with metal/metal contact pressure between the crests of teeth and roots of teeth of opposite threads is maximised, the clearances between the crests of teeth and roots of teeth being of the order of 0.05 mm.

In this way the combination of the characteristics of the profile of the thread and of the stop shoulders allows sufficient and regulated contact pressure to be obtained on both sides of the sleeve to ensure sealing while avoiding unregulated deformations of the sleeve.

Moreover, the clearance according to the axis between the teeth of the thread, that is to say the clearance between the flanks of the male and female threads, is limited to a minimum necessary for avoiding the phenomena of seizing and avoiding jamming.

Preferably in the screwed, locked state the profile of these male and female thread teeth is determined such that the male/female active flanks (loading flanks) are in mutual contact, with metal/metal pressure, whereas on the engaging flanks (stabbing flanks) there is a clearance of approximately 0.03 to 0.09 mm.

Preferably furthermore the difference of the distance apart between the bearing surface of the male shoulders on the one hand and the bearing surfaces of the female shoulder on the other hand is determined so that after screwing and tightening of the male elements in their female housings, with abutment of the front walls, the total clearance between the bearing surfaces of the two pairs of male/female shoulders is preferably less than 1 mm with an average of 0.4 mm.

The invention also relates to a process consisting of producing the threaded joint in two steps. According to this process preliminary joining of the male element of a first tube to a sleeve takes place, for example in a factory, wherein this male element is screwed until tightening is produced such that the bearing surface of its male shoulder abuts the bearing surface of the corresponding female shoulder. At that moment, according to the present instance, the front wall of the non-threaded extremity zone goes beyond the median plane by several tenths of a millimeter.

During assembly, for example at the workplace, of the second male element, the screwing will be carried out until abutment of the two front walls one against the other, with a certain degree of tightening.

The tightening of the second male element in its housing is preferably done with sufficient torque to cause a slight moving back of the first front wall, the contact surfaces of the shoulder corresponding to the first male element remaining or not remaining in contact, preferably without the first front wall moving backward beyond the median plane and preferably without going as far as making the bearing surfaces of the shoulders corresponding to the second male element come into contact in the case where such shoulders exist.

Preferably, the front walls of the two non-threaded extremity zones have a largely flat annular surface which is located in a plane perpendicular to the axis of the sleeve.

Preferably in order to obtain excellent resistance to axial strain and to tearing of the male threads from their female housing, the teeth of the male and female thread are provided with a negative angle on their active flank (loading flank). This angle is advantageously between 3° and 15° with respect to a plane perpendicular to the axis of the thread.

On the engaging flank (stabbing flank) of the teeth of the male thread an angle with a greater absolute value is preferably provided to facilitate the introduction and removing of tools. This angle is for example approximately 10° to 45° with respect to a plane perpendicular to the axis of the thread. Also preferably in order to facilitate the introduction of the male element in the female housing without damaging the thread by catching, the engaging flank is provided, in its large diameter part which joins the tip of the tooth of the male thread, with an angle which is advantageously between 30° and 70° with respect to a plane perpendicular to the axis of the thread.

Preferably, and in particular in order to better regulate the dimensions of the threads after machining, in the threaded zone in which the teeth have their full height, an incline parallel to that of the thread is provided on the crests and the roots of the male and female thread teeth. This incline is, for example, approximately 2.5 to 8% with respect to the axis of the joint.

Preferably the male stop shoulders are located between the extremity of the small diameter threaded zone and the beginning of the non-threaded extremity zone which fits into the annular passage of the sleeve between the two female housings. The female stop shoulders are thus located on either side of this annular passage.

For the most common applications of these joints alloyed or non-alloyed carbon steel components are used according to the operating conditions. For particular operating conditions stainless or refractory steels are used, or otherwise other metals or alloys.

In order to reduce the risk of seizing during the screwing up and unscrewing of the joint according to the invention a suitable lubricant is used such as an oil or grease with an appropriate viscosity. Advantageously a surface treatment can be used which lowers the friction coefficient and avoids seizing. This treatment can be limited to the sleeves and can be, for example in the case of components made from non-alloyed or weakly alloyed steel, a phosphatation with Zn or Mn phosphate. This treatment then allows an oil to be used to implement the assembly of the threaded joint. Phosphatation may be substituted by the deposition of a thin layer of a suitable metal such as Cu, Cr, Ni, Sn, Pb or another, for example by electrolysis. Oils or greases compatible with the very small clearances between the male and female threads are used.

The Figures and the examples hereinafter describe in a non-limitative manner, a method of production of the joint and of the process according to the invention.

Figure 1:
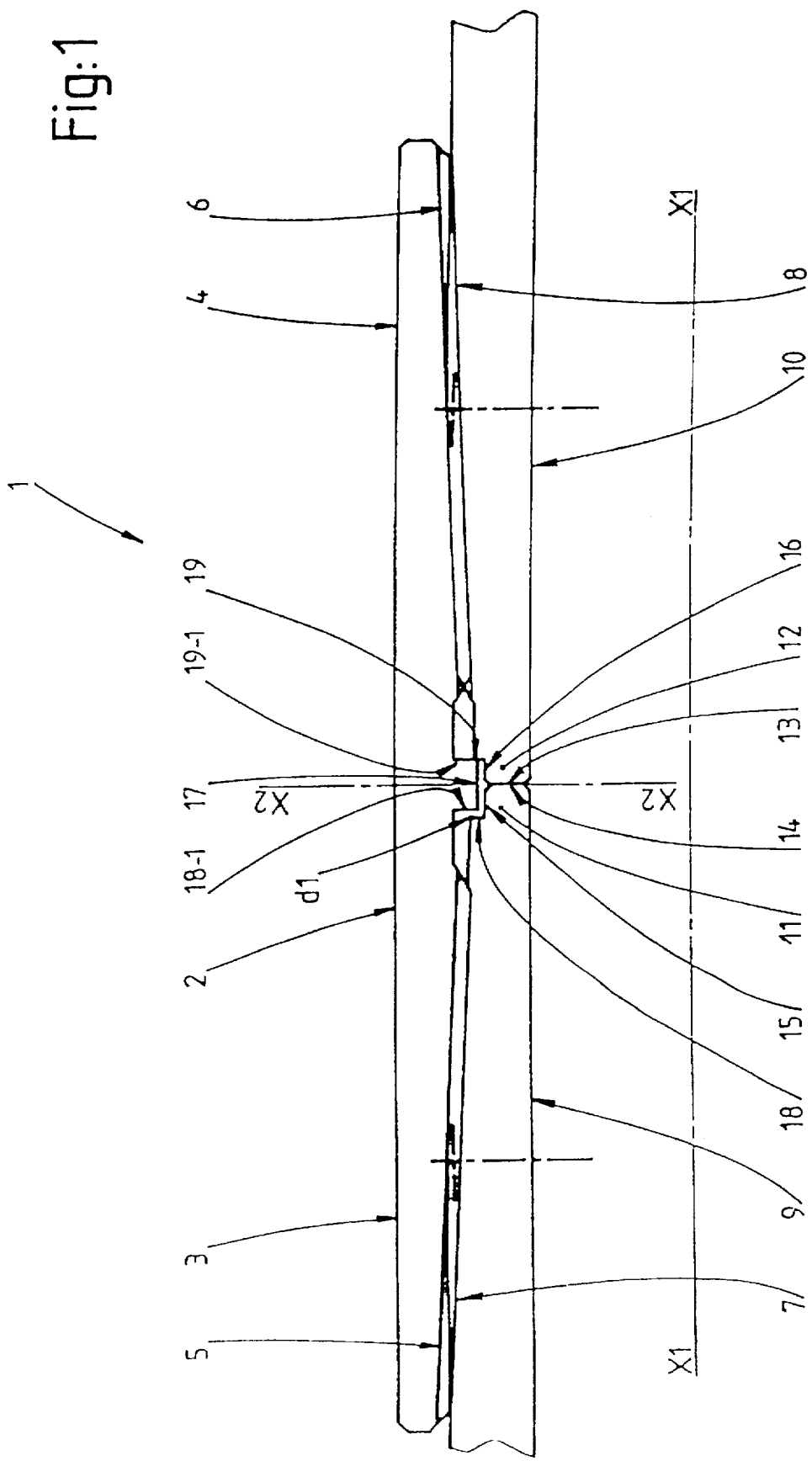
FIG. 1 is a schematic sectional view of a joint using a sleeve according to the invention, in which only the section above the axis of symmetry is shown.

FIG. 1 is a schematic sectional view of the whole of a threaded joint 1 comprising a sleeve 2 made of steel provided with two female housings 3 and 4 with an axis X1—X1. These housings are provided with internal tapered threads 5, 6 into which engage the external tapered threads 7, 8 of the male elements 9, 10 of two steel tubes which are to be joined.

Beyond the small diameter extremity 32 of the threaded part, each male element 9, 10 comprises a non-threaded extremity zone 11, 12 provided with a front wall 13, 14. These front walls with the same dimensions each comprise a largely flat annular abutting surface located in a plane perpendicular to the axis X1—X1 of the sleeve. The length of each extremity zone 11, 12 is determined such that the front walls 13, 14 are capable of abutting one against the other with a certain degree of sealing when each male element 9, 10 is sufficiently locked by screwing into its housing. The plane of abutment of these front walls is thus in the vicinity of the line of the median plane X2—X2 of the sleeve 2. The external surface 15, 16 of the non-threaded extremity zone 11, 12 is cylindrical and has a diameter less than that of the internal surface 17, which is also cylindrical, of the axial annular passage of the sleeve 2. The clearance between these two opposite annular surfaces is sufficient for the elastic deformation resulting from the tightening of the male elements 9, 10 in their housings 3, 4 and the corresponding tightening of the front walls 13, 14 in abutment one against the other, not to allow these external surfaces 15 and 16 to come into continuous and sealing contact with the internal surface 17 around the entire circumference.

Figure 2:
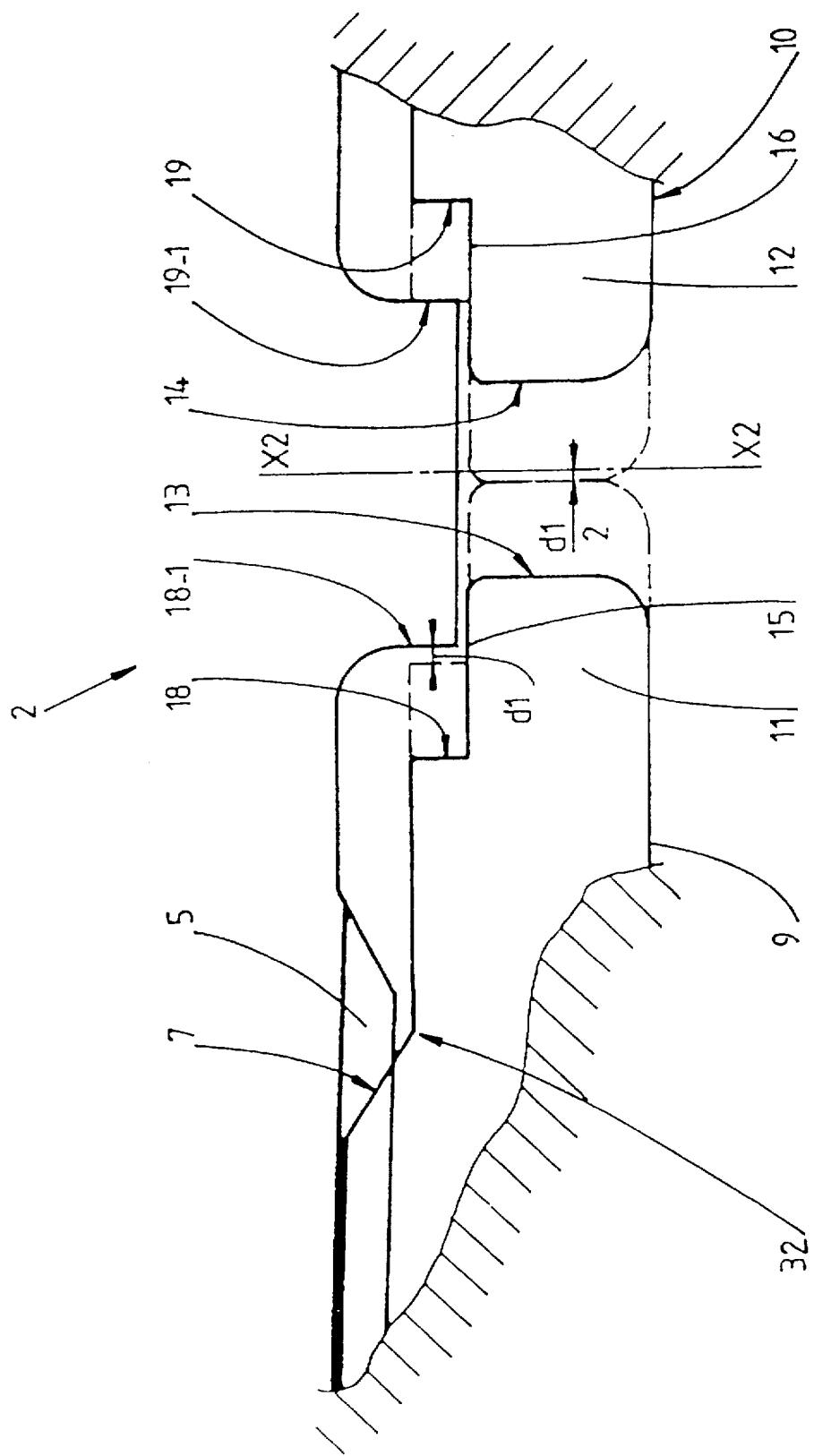
FIG. 2 is an enlarged view of the median zone of FIG. 1, showing the conditions of tightening the two male elements in abutment one against the other.

In order to regulate the screwing position and to prevent excessive tightening by over-screwing of each male element 9, 10 in the corresponding female housing 3, 4 two pairs of male/female stop shoulders 18, 18-1 and 19, 19-1 are used to regulate tightening. The two bearing surfaces 18, 19 of the male stop shoulders are equidistant from the front wall 13, 14 of the corresponding extremity zone 11, 12 and the two bearing surfaces 18-1, 19-1 of the female stop shoulders are equidistant from the median plane X2—X2 of the sleeve. Moreover, the distance apart of the bearing surfaces 18-1, 19-1 of the female stop shoulders is smaller than the distance apart of the bearing surfaces of the two male shoulders when the front surfaces 13, 14 of the extremity zones 11, 12 are abutted. This difference in the distance apart is determined such that even when the two male elements 9, 10 are firmly locked into their housings 3, 4 by screwing, the front surfaces 13, 14 being locked in abutment one against the other, a slight clearance "d1" remains at the level of at least one pair of bearing surfaces such as 18, 18-1 as shown in FIGS. 1 and 2. It should be noted that apart from the elastic deformations this clearance "d1" is double the distance which separates the plane of the front surface of the corresponding male element constituting the plane of abutment from the median plane of the sleeve. In the case of joining of tubes with an external diameter of, for example, 14 inches (355.6 mm), the total clearance "d1" can usually be approximately 0.15 to 0.4 mm.

In order to produce the threaded joint according to the invention, as shown in a schematic manner in FIG. 2 the male element 10 can firstly be joined to the sleeve 2, in its housing 4, for example in the factory, until the bearing surfaces 19, 19-1 of the corresponding pair of stop shoulders abut. At this time the front wall 14 of the extremity zone 12 goes beyond the median plane X2—X2 to a distance approximately equal to half of the total clearance "d1". This position of the extremity zone 12 and its front wall 14 is indicated by dashed lines. After this joining is done, for example at the workplace, either during the initial assembly or during repair of a column of tubes, of the other male element 9 by screwing into its housing 3 until its front wall 13 abuts the front wall 14. At this time it is observed that there is a slight clearance "d1" between the bearing surfaces 18, 18-1 of the corresponding male and female stop shoulders. In practice it is necessary to carry out sufficient tightening of the front surfaces in an abutting manner. This tightening can involve parting of the bearing surfaces 19, 19-1 and possibly in the case of over-screwing abutment of the surfaces 18, 18-1. In practice the increase in the tightening torque beyond the abutment of the front walls is rapid and thus allows regulation by measuring the torque and/or by means of measuring the angular displacement, the degree of tightening necessary to achieve the desired amount of tightening in an abutted manner of the front walls 13, 14 one against the other. This disposition of the stop shoulders in combination with the profile of the male and female threads as described in the descriptions hereinafter allows regulation of the contact pressures to the level desired in the thread and thus to obtain the degree of sealing sought at the level of the thread.

It should be noted that in the case of over-screwing of the male element 9 it cannot advance beyond the abutment of the bearing surfaces 18, 18-1 of the stop shoulders, this involving a corresponding moving back of the plane of abutment between the front walls 13, 14, this abutment of the bearing surfaces 18,18-1 constituting a complementary assurance of correct screwing of the threaded joint.

Figure 3:
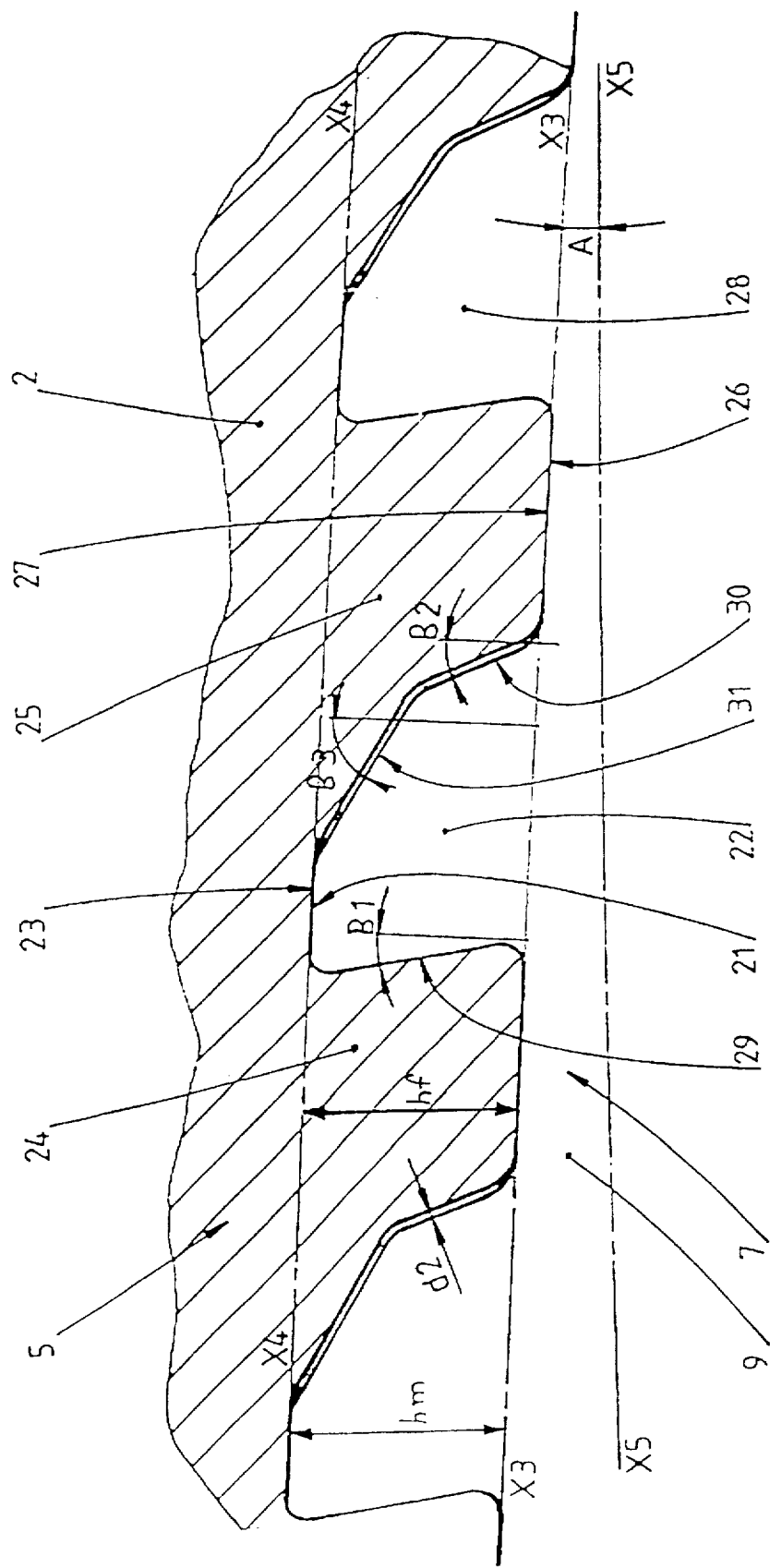
FIG. 3 is an enlarged view of the joined state of the tapered male and female threads according to the invention.

FIG. 3 is an enlarged view of tapered threads in the joined state, which allow, according to the invention, mechanical strength and sealing to be combined.

On at least a quarter of the total length of the threaded zone, length comprising the vanishing threads and advantageously over the whole of the length of the threaded zone in which the teeth have their full length, the height h m of the teeth of the male thread is selected to be identical to the height h f of the teeth of the female thread, the tolerances being the same for h m and h f, preferably of the order of ±0.025 mm.

The heights hm and hf are measured according to a perpendicular to the axis X1—X1 of the joint, only the axis X5—X5 parallel to the axis X1—X1 being represented on FIG. 3.

As a result, apart from the clearances due to tolerances, that is a maximum clearance of 0.05 mm, the crests such as 21 of the male thread teeth such as 22 belonging to the thread 7 of the male element 9 in FIGS. 1 and 2 are in contact in the locked state with the roots of female threads such as 23 situated between the teeth of the female threads 24 and 25 belonging to the thread 5 of the sleeve 2.

In the same way, the crests such as 27 of the teeth of the female threads such as 25 are in contact with the roots of the male threads such as 26 situated between the teeth of the male threads 22 and 28 belonging to the thread 7.

The tangents X3—X3 and X4—X4 at the roots and crests of the male and female threads are mutually parallel and inclined with respect to a parallel X5—X5 to the axis X1—X1 of the thread by an angle "A". This angle, which can vary within substantial limits according to the diameter of the tubes and of the pitch of the thread is, for example, between 1.79° and 3.58°.

The geometry, the dimensions and the machining of the threads 5–6 of the sleeve 2 and of the threads 7–8 of the male elements 9–10 are determined, taking into account the general tapering, in order to ensure interference between the male element 9–10 and the female housing 3–4 in the screwed-joined state. This interference is perfectly regulated and constant because of the presence of the stop shoulders. As a result, as shown in FIG. 3 a joint is obtained which is mechanically highly monolithic, aided by the fact that, as will be described hereinafter, the active flank such as 29 has a negative incline.

As shown in FIG. 3, the angle of the active flank (loading flank) 29 of each tooth of the male thread such as 22 and female thread such as 24 is negative, that is to say this flank is inclined towards the exterior with respect to the plane perpendicular to the axis X1—X1 of the thread adjacent to the base of this active flank. In the case of the present example this angle "B1" is −10° and can preferably be selected between approximately −3° to −15°. It should be noted that in the case of a male thread such as 22, locked in its female housing 33, there is no clearance between the active flank such as 29 and the flank of the tooth of the female thread 24 against which it bears.

The lower part 30 of the engaging flank (stabbing flank) of the tooth of the male thread such as 22 is inclined towards the inside by an angle "B2" of approximately 20° with respect to a plane perpendicular to the axis X1—X1 adjacent to the base of this engaging flank 30.

This angle "B2" can vary, for example, between approximately 10 to 45°. Preferably its absolute value is greater than the angle of the active flank in order to facilitate machining and assembly of the joint. The upper part of this engaging flank optionally and advantageously comprises a cut-away 31 inclined at an angle "B3" which in the case of FIG. 3 is at approximately 55° with respect to a plane which intersects it perpendicularly to X1—X1. This angle B3 can vary for example between approximately 30° and 70°. This cut-away, as explained in the general description, permits reduction of the risk of catching between male and female threads in the case of incorrect centering during the introduction of the male element into its female housing and at the start of screwing.

As shown in FIG. 3 a slight clearance "d2" is retained between the engaging flank and the flank opposite with respect to the female thread so that at the time of tightening interference takes place correctly between the crests and the teeth of the male and female threads and their respective housings, involving a slight elastic deformation which ensures efficient tightening.

This clearance "d2" must in any case remain sufficiently small so that it does not allow a leak or non-sealing along the threads according to a helical path.

One means of reducing or blocking this leakage path is to use a lubricant, oil or grease which can contain a pre-determined amount of fine solid particles such as graphite or lead. The elimination before re-screwing of these deposited particles is possible but represents a supplementary operation to be carried out. It is therefore more often preferred to use a clearance which is as small as possible over one part at least of the axial length of the thread, for example over at least a third of the total axial length of the thread, and this clearance may have a value "d2" of between approximately 0.03 and 0.09 mm on the engaging flank, the clearance on the active flank being considered to be zero. The use of an oil or grease with a suitable viscosity then allows sealing to be regulated together with the size of "d2".

Advantageously prior surface treatments are used such as Zn or Mn phosphatation in the case of a carbon or weakly alloyed steel sleeve, which lower the friction coefficient of a steel in association with an oil with suitable viscosity.

It is most often sufficient to carry out the surface treatment of the sleeve only.

Instead of phosphatation, deposition of a small thickness of metal can be used, such as for example an electrolytic deposition of Cu, Cr, Ni, Sn, Pb or another. These depositions can be carried out on a large range of alloyed or non-alloyed, stainless or refractory steels and also on other metals or alloys. Other methods of deposition can also be used in a known manner to reduce the friction coefficient and prevent seizing.

Thus, by virtue of the geometry and the dimensions of the male thread teeth with respect to the geometry and the dimensions of the teeth of the female thread in combination with the system of shoulder stops which has been described, the interference in the joined state between the female housing and the male element is perfectly regulated, the two extremities of the joint being processed and assembled as though they were independent.

A joint results which, in spite of the absence of separate metal/metal sealing surfaces of the thread, provides an excellent degree of sealing with respect to liquids such as water or petroleum in the extreme extraction conditions found in the petroleum industry, which extraction conditions do not permit the use of standard threaded joints.

The joint according to the present invention further has the advantage of being economical because of the absence of excess thickness of the sleeve in order to produce an abutting heel for the male elements and simple assembly at the workplace notably because of the configuration and the clearances in the axial passage produced in the sleeve.

Although it can be used for a wide range of sizes, such a joint is particularly useful for joining large diameter tubes, for example casings of petroleum wells, for example with outside diameters of the order of 127 mm (5") to 508 mm (20"), this example of use and these dimensions being totally non-limitative.

The present invention can be the subject-matter of numerous variations of embodiments which form part of the scope claimed.

We claim:

1. Thread joint for tubes comprising:

a sleeve provided with first and second female housings, each female housing having internal tapered threads, a first tube and a second tube, each tube having a male element provided with an external tapered thread that corresponds with the internal tapered threads of the female housings which comprises a non-threaded extremity zone which engages into an annular axial passage of the sleeve, the extremity zone comprising a front wall, the male element of the first tube being screwed into the first female housing and the male element of the second tube being screwed into the second female housing the front walls of the two male elements abutting one against the other when screwing is completed, wherein the non-threaded extremity zones slide with clearance into the inside of the annular axial passage and clearance being maintained between the non-threaded extremity zones and the inside of the annular axial passage of the sleeve over substantially an entire inner circumference of the annular axial passage when screwing is completed, further comprising at least one pair of male and female stop shoulders disposed on the female housing and corresponding male element which allows axial positioning of each of the male elements in its female housing and of the abutting front walls, teeth of the male threads having a constant height over an axial length representing a part of a total length of a threaded zone, identical to the height of female thread teeth, wherein when screwing is completed interference exists between male and female threads.

2. Threaded joint according to claim 1, wherein the at least one pair of male and female stop shoulders is provided with two pairs of male and female stop shoulders disposed on the two housings and the corresponding male elements.

3. Threaded joint according to claim 2, wherein each male stop shoulder, is located between a small diameter extremity of the male threaded zone and the beginning of the non-threaded extremity zone, each female stop shoulder being located between a small diameter extremity of the female threaded zone and the start of the axial passage of the sleeve.

4. Threaded joint according to claim 2, wherein a distance apart of bearing surfaces of the male shoulders is greater when the front walls are abutting, than that of bearing surfaces of the female shoulders.

5. Threaded joint according to claim 1, wherein the axial length over which the male thread teeth have a constant height identical to the height of the teeth of the female threads is at least equal to a quarter of the total length of the threaded zone.

6. Threaded joint according to claim 1, wherein the male thread teeth have a constant height identical to the height of the teeth of the female threads over the whole of the length of the threaded zone in which the teeth have their full height.

7. Threaded joint according to claim 1, wherein active flanks of the teeth of the male thread and the female thread are at a negative angle.

8. Threaded joint according to claim 1, wherein engaging flanks of teeth of the male thread have a greater incline in absolute value than an incline of active flanks of male thread teeth.

9. Threaded joint according to claim 1, wherein upper parts of engaging flanks of male thread teeth have an inclination of 30° to 70°.

10. Threaded joint according to claim 1, wherein a residual clearance between engaging flanks of teeth of the male and female threads is substantially 0.03 to 0.09 mm.

11. Threaded joint according to claim 1, further comprising clearances existing between crests and roots of male and female teeth are substantially 0 to 0.05 mm.

12. Threaded joint according to claim 1, further comprising crests and roots of teeth of male and female threads being parallel to an incline with respect to an axis of the threaded joint.

13. Threaded joint according to claim 1, further comprising a state of a surface of the sleeve being modified by a means for treatment reducing its friction coefficient and preventing seizing.

14. Threaded joint according to claim 1, wherein the front walls of each of the two male elements have an annular surface largely plane and which is in a plane perpendicular to an axis of the sleeve.

15. Process for production of a threaded joint according to claim 2, wherein initial joining of the sleeve with the first male threaded element is carried out, with screwing and tightening until abutment of one against the other of the bearing surfaces of the first pair of corresponding shoulders, then in that the screwing of the second male element until abutment of the front walls of these two male elements is carried out, while retaining a clearance between the bearing surfaces of the second pair of shoulders.

* * * * *